United States Patent
Nunokawa (10) Patent No.: US 11,626,603 B2
(45) Date of Patent: Apr. 11, 2023

(54) FUEL CELL SYSTEM

(71) Applicant: SUBARU CORPORATION, Tokyo (JP)

(72) Inventor: Takumi Nunokawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/475,861

(22) Filed: Sep. 15, 2021

(65) Prior Publication Data
US 2022/0085395 A1     Mar. 17, 2022

(30) Foreign Application Priority Data

Sep. 17, 2020   (JP) .............................. JP2020-156096

(51) Int. Cl.
| | |
|---|---|
| *H01M 8/04* | (2016.01) |
| *H01M 8/04746* | (2016.01) |
| *H01M 8/04111* | (2016.01) |
| *H01M 8/0438* | (2016.01) |
| *H01M 8/04701* | (2016.01) |
| *H01M 8/04029* | (2016.01) |

(52) U.S. Cl.
CPC ... *H01M 8/04753* (2013.01); *H01M 8/04029* (2013.01); *H01M 8/04111* (2013.01); *H01M 8/04395* (2013.01); *H01M 8/04701* (2013.01); *H01M 8/04768* (2013.01)

(58) Field of Classification Search
CPC ......... H01M 8/04753; H01M 8/04029; H01M 8/04111; H01M 8/04395
See application file for complete search history.

(56) References Cited

U.S. PATENT DOCUMENTS

2007/0166577 A1 * 7/2007 Inai .................. H01M 8/04268
                                                             429/513

FOREIGN PATENT DOCUMENTS

JP        2004-296326 A    10/2004

* cited by examiner

*Primary Examiner* — Olatunji A Godo
(74) *Attorney, Agent, or Firm* — Troutman Pepper Hamilton Sanders LLP (57) ABSTRACT

A fuel cell system includes a fuel cell, a supercharger, a coolant circuit, a pump controller, and a pressure regulating mechanism. The supercharger applies pressure to cathode gas and supplies the cathode gas to the fuel cell. The coolant circuit has a coolant circulation pump and a cooler and circulates a coolant to be supplied to a coolant channel in the fuel cell. The pressure regulating mechanism regulates coolant pressure in the fuel cell. The pump controller controls a rotation speed of the pump in accordance with a heat release amount required by the fuel cell and controls the pump in a range lower than or equal to an upper limit for the rotation speed set based on one or both of inlet coolant pressure of the pump or a correlation value thereof and an inlet coolant temperature of the pump or a correlation value thereof.

17 Claims, 7 Drawing Sheets

FUEL CELL SYSTEM

CROSS-REFERENCE TO RELATED APPLICATION

The present application claims priority from Japanese Patent Application No. 2020-156096 filed on Sep. 17, 2020, the entire contents of which are hereby incorporated by reference.

BACKGROUND

The disclosure relates to fuel cell systems.

A fuel cell generates electricity in accordance with an electrochemical reaction between anode gas, such as hydrogen gas, and cathode gas, such as oxygen (air). Since heat is generated when electricity is generated, a fuel cell system is provided with a coolant circuit. A coolant circuit includes a coolant circulation pump that circulates a coolant and a radiator that cools the coolant flowing out from the fuel cell, and circulates the coolant to be supplied to a coolant channel within the fuel cell. Because the amount of heat generated increases with increasing output (generated electric power) of the fuel cell, the rotation speed of the coolant circulation pump increases with increasing output of the fuel cell. Moreover, the rotation speed of the coolant circulation pump increases with increasing difference between the current temperature of the fuel cell and the target temperature to which the temperature of the fuel cell is to be lowered.

In the fuel cell, a separator composed of either one of metal and carbon is disposed between a coolant plate provided with the coolant channel and either one of an anode plate through which the anode gas flows and a cathode plate through which the cathode gas flows. When a pressure difference occurs between the pressure of either one of the anode gas and the cathode gas and the pressure of the coolant, stress is applied to the separator, possibly causing the separator to be fatigued, corrode, or break. Although it is conceivable to increase the strength of the separator by increasing the thickness thereof, an increased thickness of the separator leads to an increase in size and weight of the fuel cell, as well as an increase in production cost. In a case where the separator is composed of stainless steel, it is known that the separator tends to decrease in fatigue strength in an acidic environment where the separator may come into contact with the cathode gas. Reducing the actual stress applied to the separator contributes to increased durability of the fuel cell.

Japanese Unexamined Patent Application Publication (JP-A) No. 2004-296326 discloses a technology for controlling the coolant circulation pump such that the pressure of the coolant to be supplied to the fuel cell accords with the supply pressure of either one of the anode gas and the cathode gas. In more detail, JP-A No. 2004-296326 proposes a fuel cell system that controls the supply pressure of at least one of oxidant gas and fuel gas with reference to the supply pressure of the coolant at a low temperature at which the viscosity of the coolant increases, and controls the coolant supply pressure with reference to the gas supply pressure during normal operation of the fuel cell.

SUMMARY

An aspect of the disclosure provides a fuel cell system including a fuel cell, a supercharger, a coolant circuit, a pump controller, and a pressure regulating mechanism. The fuel cell includes an anode gas channel, a cathode gas channel, and a coolant channel. The supercharger is configured to apply pressure to cathode gas and supply the cathode gas to the fuel cell. The coolant circuit is provided with a coolant circulation pump and a cooler and is configured to circulate a coolant to be supplied to the coolant channel. The pump controller is configured to control a rotation speed of the coolant circulation pump in accordance with a heat release amount required by the fuel cell. The pressure regulating mechanism is provided independently of the coolant circulation pump and is configured to regulate coolant pressure in the fuel cell. The pump controller is configured to control the coolant circulation pump in a range lower than or equal to an upper limit for the rotation speed of the coolant circulation pump. The upper limit is set based on one or both of coolant pressure at an inlet of the coolant circulation pump or a correlation value of the coolant pressure at the inlet of the coolant circulation pump and a coolant temperature at the inlet of the coolant circulation pump or a correlation value of the coolant temperature.

An aspect of the disclosure provides a fuel cell system including a fuel cell, a supercharger, a coolant circuit, a pressure regulating mechanism, and circuitry. The fuel cell includes an anode gas channel, a cathode gas channel, and a coolant channel. The supercharger is configured to apply pressure to cathode gas and supply the cathode gas to the fuel cell. The coolant circuit is provided with a coolant circulation pump and a cooler and is configured to circulate a coolant to be supplied to the coolant channel. The pressure regulating mechanism is provided independently of the coolant circulation pump and is configured to regulate coolant pressure in the fuel cell. The circuitry is configured to control a rotation speed of the coolant circulation pump in accordance with a heat release amount required by the fuel cell. The circuitry is configured to control the coolant circulation pump in a range lower than or equal to an upper limit for the rotation speed of the coolant circulation pump. The upper limit is set based on one or both of coolant pressure at an inlet of the coolant circulation pump or a correlation value of the coolant pressure at the inlet of the coolant circulation pump and a coolant temperature at the inlet of the coolant circulation pump or a correlation value of the coolant temperature.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

In order to meet the demands for higher output of fuel cells in recent years, a known technology achieves higher power generation efficiency by applying pressure to the cathode gas with a supercharger, and supplying the pressure to the fuel cell. In a case where the fuel cell is to operate with high output, the amount of heat generated increases. Thus, it is desirable that the flow rate of the coolant be increased by increasing the output of the coolant circulation pump, so that the cooling capacity can be enhanced.

However, because the fuel cell system disclosed in JP-A No. 2004-296326 adjusts the coolant supply pressure by controlling the output of the coolant circulation pump, if the coolant supply pressure is controlled with reference to the gas supply pressure during normal operation after warm-up operation, the flow rate of the coolant becomes insufficient due to limited output of the coolant circulation pump, possibly resulting in insufficient cooling. In a case where the pressure of the coolant to be supplied to the fuel cell is made adjustable independently of the control of the coolant circulation pump, and the flow rate of the coolant is increased while the pressure of the coolant is reduced, the pressure at the inlet of the coolant circulation pump excessively decreases due to a pressure loss occurring when the coolant flowing out from the fuel cell travels through a pipe, the radiator, and so on, possibly causing cavitation to occur. When cavitation occurs, an abnormal sound or vibrations may occur, possibly leading to a malfunction of the coolant circuit.

It is desirable to provide a fuel cell system that suppresses the occurrence of cavitation at the inlet of the coolant circulation pump while suppressing a pressure difference between the coolant pressure in the fuel cell and the reactant gas pressure to be supplied to the fuel cell, and that can maintain the cooling efficiency of the fuel cell.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, an overall configuration example of a fuel cell system according to an embodiment of the disclosure will be described. In this embodiment, a fuel cell system 1 is equipped in, for example, a fuel-cell vehicle, but is not limited to such an example and may be used for other purposes.

Figure 1:
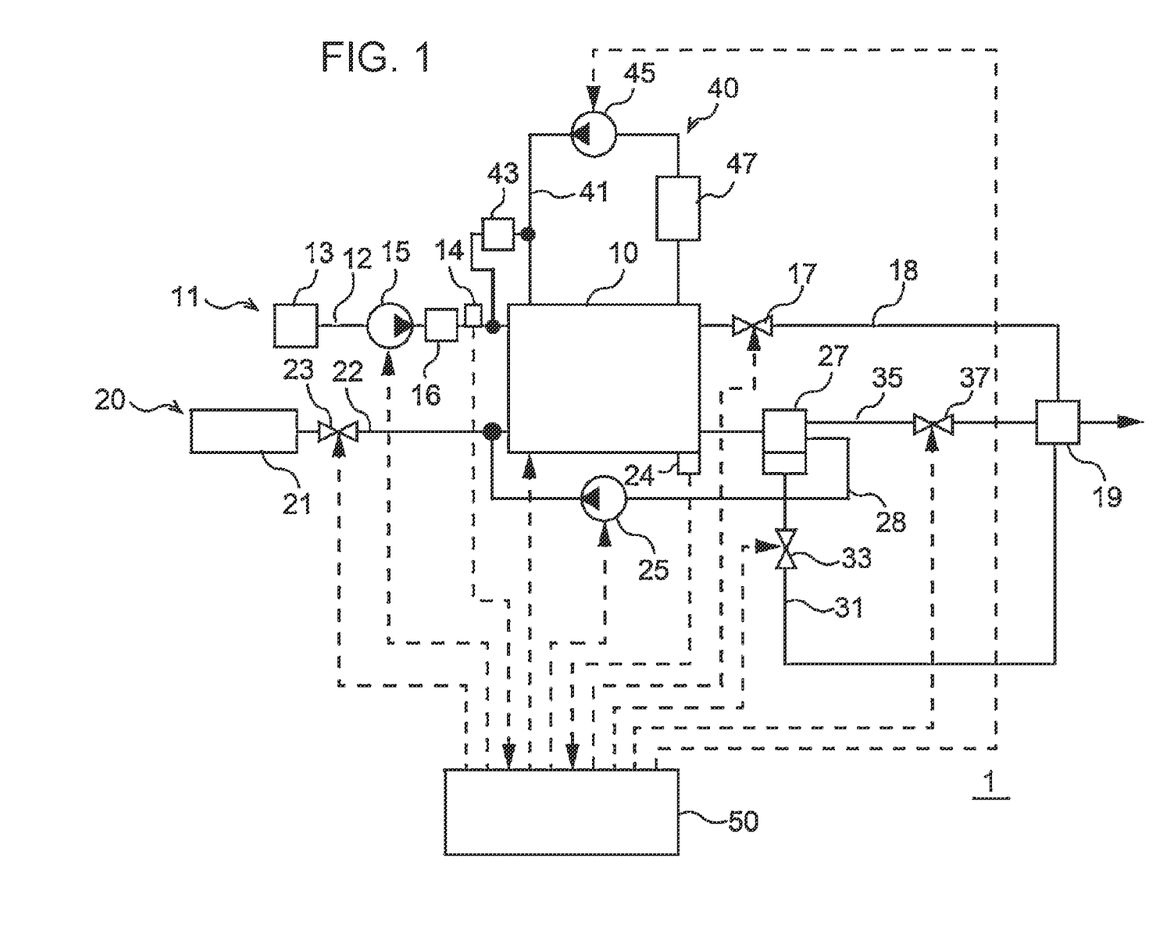
FIG. 1 schematically illustrates an example of the overall configuration of a fuel cell system according to an embodiment of the disclosure.

FIG. 1 schematically illustrates an example of the overall configuration of the fuel cell system 1 according to this embodiment. The fuel cell system 1 includes an oxidation gas path 11, a hydrogen gas path 20, a fuel cell 10 having a plurality of fuel cell members, and a controller 50 that controls the entire system. In one embodiment, the oxidation gas path 11 may serve as a "cathode gas channel", and the hydrogen gas path 20 may serve as an "anode gas channel". The fuel cell system 1 supplies hydrogen gas and oxidation gas to the fuel cell 10 and causes an electrochemical reaction to occur between the hydrogen gas and the oxidation gas within the fuel cell members, thereby generating electricity. In one embodiment, the hydrogen gas and the oxidation gas may serve as "anode gas" and "cathode gas", respectively. Furthermore, the fuel cell system 1 includes a coolant circuit 40 that cools the fuel cell 10 by supplying a refrigerant to the fuel cell 10, and an electric power system (not illustrated) that charges and discharges electric power to and from the system. This embodiment relates to an example where air (oxygen) is used as the oxidation gas. The oxidation gas (oxygen) and the hydrogen gas may sometimes be collectively referred to as reactant gases.

The fuel cell 10 is, for example, a solid polyelectrolyte fuel cell and has a stack structure having a plurality of stacked fuel cell members. Each fuel cell member has a hydrogen electrode at one of electrolytic surfaces of an ion-exchange membrane, and has an oxygen electrode at the other surface. Furthermore, the fuel cell members have a pair of separators disposed to sandwich the hydrogen electrode and the oxygen electrode. Hydrogen gas is supplied to a hydrogen gas channel provided at the hydrogen electrode, air is supplied to an air channel provided at the oxygen electrode, and a reaction between the supplied hydrogen gas and the supplied air causes the fuel cell 10 to generate electricity.

The fuel cell 10 is provided with a temperature sensor 24. The temperature sensor 24 detects, for example, the temperature of the fuel cell members. A sensor signal of the temperature sensor 24 is transmitted to the controller 50. The temperature sensor 24 is not particularly limited to any kind. Moreover, the location where the temperature sensor 24 is disposed is not particularly limited.

Figure 2:
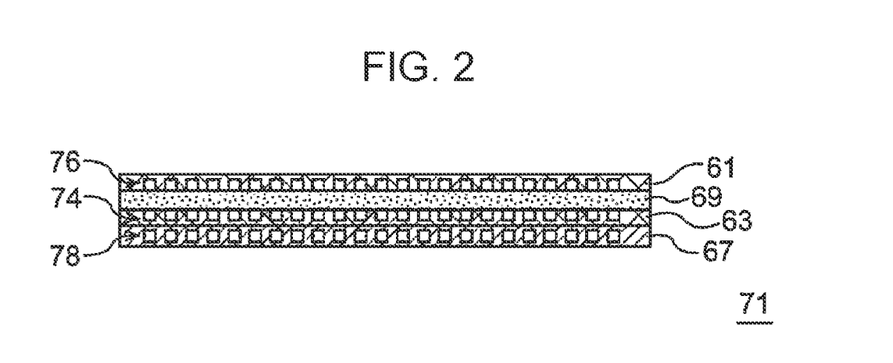
FIG. 2 is a cross-sectional view illustrating a configuration example of a fuel cell member.

FIG. 2 is a cross-sectional view of one of fuel cell members 71. The fuel cell 10 has a stack structure obtained by stacking a plurality of the illustrated fuel cell members 71. Each fuel cell member 71 includes a hydrogen electrode 61, an oxygen electrode 63, a separator 67, and an electrolyte membrane 69. The hydrogen electrode 61 and the oxygen electrode 63 are disposed to sandwich the electrolyte membrane 69. The separator 67 is provided with a coolant channel 78. By stacking the fuel cell members 71, the separators 67 are interposed between the hydrogen electrodes 61 and the oxygen electrodes 63 of the neighboring fuel cell members 71, such that the hydrogen electrodes 61 and the oxygen electrodes 63 are disposed adjacent to the separators 67 individually provided with the coolant channels 78.

The hydrogen electrode 61 has a plurality of hydrogen gas channels 76 that are coupled to a hydrogen supply channel 22 via a hydrogen supply manifold (not illustrated). In one embodiment, the hydrogen gas channels 76 may serve as an "anode gas channel". Hydrogen gas supplied to each hydrogen gas channel 76 travels through a reaction region (not illustrated), and is subsequently discharged to a circulation channel 28 via a hydrogen discharge manifold. The oxygen electrode 63 has a plurality of air channels 74 that are coupled to an air supply channel 12 via an air supply manifold (not illustrated). In one embodiment, the air channels 74 may serve as a "cathode gas channel". Air supplied to each air channel 74 travels through the reaction region (not illustrated), and is subsequently discharged to an air discharge channel 18 via an air discharge manifold. Furthermore, the coolant channel 78 provided in the separator 67 is coupled to the coolant circuit 40 via a refrigerant supply manifold (not illustrated). A refrigerant supplied to the coolant channel 78 travels through the reaction region (not illustrated), and is subsequently returned to the coolant circuit 40 via a refrigerant discharge manifold.

Referring back to FIG. 1, the oxidation gas path 11 includes the air supply channel 12 through which air to be supplied to the fuel cell 10 flows, and also includes the air discharge channel 18 through which oxidation off-gas discharged from the fuel cell 10 flows. The air supply channel 12 includes a supercharger 15 that takes in air via an air filter 13, a cooler 16 that cools the air, and a pressure sensor 14 that detects the supply pressure of the air. The supercharger 15 is driven by the controller 50, applies pressure to the air taken in, and supplies the air to the fuel cell 10. The supercharger 15 may be either one of a blower and a compressor as an example, but is not limited thereto. The cooler 16 increases the density of the air by cooling the air, so as to enhance the power generation efficiency of the fuel cell 10. The cooler 16 used may be, for example, an intercooler that utilizes an airflow received by the running vehicle or that utilizes a coolant. The pressure sensor 14 is provided downstream of the cooler 16 and detects the pressure of the air in the air supply channel 12. A sensor signal of the pressure sensor 14 is transmitted to the controller 50.

The air supply channel 12 is coupled to the air channels 74 in each of the fuel cell members 71. The air channels 74 in each fuel cell member 71 are coupled to the air discharge channel 18. The air discharge channel 18 is equipped with a back-pressure regulating valve 17. The back-pressure regulating valve 17 is driven by the controller 50 and adjusts the supply pressure of the air in the fuel cell 10. The oxidation off-gas discharged to the air discharge channel 18 is discharged into the atmosphere via a diluter 19 provided at a merging area between the air discharge channel 18 and a hydrogen discharge channel 35.

The hydrogen gas path 20 includes a hydrogen supply source 21, the hydrogen supply channel 22 through which the hydrogen gas to be supplied to the fuel cell 10 from the hydrogen supply source 21 flows, the circulation channel 28 for returning the hydrogen gas (hydrogen off-gas) discharged from the fuel cell 10 to the hydrogen supply channel 22, and a circulation pump 25 that pumps the hydrogen off-gas in the circulation channel 28 to the hydrogen supply channel 22. The hydrogen gas path 20 also includes a gas-liquid separator 27 provided in the circulation channel 28, and a discharge channel 31 and the hydrogen discharge channel 35 that are coupled to the gas-liquid separator 27.

For example, the hydrogen supply source 21 is formed of a high-pressure tank or is composed of a hydrogen adsorption alloy, and retains high-pressure hydrogen gas. The hydrogen supply channel 22 is equipped with a pressure regulating valve 23 that adjusts the pressure of hydrogen gas to be supplied to the fuel cell 10. The pressure regulating valve 23 may be, for example, a decompression valve that reduces the pressure of hydrogen gas to a predetermined pressure. Alternatively, the pressure regulating valve 23 may be a pressure regulating valve, such as an injector, driven by the controller 50. A shut-off valve that permits or forbids the supply of hydrogen gas to the fuel cell 10 may be provided upstream of the pressure regulating valve 23. The hydrogen supply channel 22 is coupled to the hydrogen gas channels 76 of each fuel cell member 71. The hydrogen gas channels 76 of each fuel cell member 71 are coupled to the circulation channel 28.

The circulation pump 25 is driven by the controller 50 to circulate and supply the hydrogen gas in the circulation channel 28 to the fuel cell 10. The circulation channel 28 is provided with the gas-liquid separator 27. The gas-liquid separator 27 separates water from the hydrogen off-gas and collects the water. The gas-liquid separator 27 is coupled to the discharge channel 31 and the hydrogen discharge channel 35. The discharge channel 31 is coupled to the diluter 19 via a water purge valve 33. The water purge valve 33 is opened and closed by being driven by the controller 50, and discharges the water collected by the gas-liquid separator 27 to the diluter 19.

The hydrogen discharge channel 35 is coupled to the diluter 19 via a hydrogen purge valve 37. The hydrogen purge valve 37 is opened and closed by being driven by the controller 50, and introduces the hydrogen off-gas discharged from the fuel cell 10 to the diluter 19. The discharged hydrogen off-gas is diluted by being mixed with oxidation off-gas in the diluter 19, and is released into the atmosphere.

The coolant circuit 40 includes a coolant circulation pump 45 that circulates the coolant, and also includes a cooler 47 that causes the coolant discharged from the fuel cell 10 to dissipate heat. The coolant circulation pump 45 is driven by the controller 50. In this embodiment, the coolant circulation pump 45 used is a motor pump that takes in the coolant and discharges the coolant in accordance with rotation of a motor. Such a coolant circulation pump 45 is characterized in that the amount of discharge increases with increasing rotation speed of the motor. The cooler 47 is provided at the inlet side of the coolant circulation pump 45. The cooler 47 may be an appropriate cooling unit, such as a radiator.

An outlet channel 41 at the outlet side of the coolant circulation pump 45 is coupled to a pressure regulating mechanism 43. The pressure regulating mechanism 43 is also coupled to the air supply channel 12 at the downstream side of the cooler 16. The pressure regulating mechanism 43 receives the coolant pressure in the outlet channel 41 and the air supply pressure in the air supply channel 12 so as to operate in accordance with a pressure balance. In one embodiment, the air supply pressure may serve as a "reactant gas pressure". Such a pressure regulating mechanism 43 has a function of equalizing the pressure difference between the coolant pressure and the air supply pressure to be supplied to the fuel cell 10, so as to equalize the coolant pressure and the air pressure in the fuel cell 10.

Figure 3:
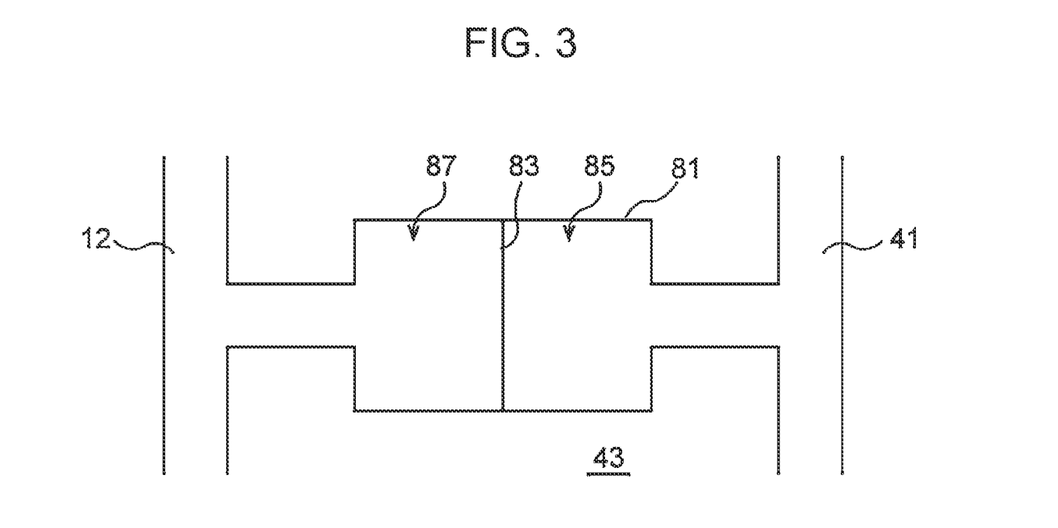
FIG. 3 schematically illustrates a configuration example of a pressure regulating mechanism.

FIG. 3 schematically illustrates an example of the configuration of the pressure regulating mechanism 43. In this embodiment, the pressure regulating mechanism 43 includes a housing 81 and a partition member 83 that partitions the interior of the housing 81. The housing 81 has enough strength so as not to deform against the air supply pressure and the coolant pressure. The interior of the housing 81 is partitioned into a first space 85 and a second space 87 by the partition member 83. The first space 85 communicates with the outlet channel 41, and the second space 87 communicates with the air supply channel 12. The partition member 83 is stretchable and is joined to the inner surface of the housing 81. Accordingly, the coolant or the air is prevented from traveling back and forth between the first space 85 and the second space 87.

In the pressure regulating mechanism 43 having such a configuration, the partition member 83 functions as an interface to which the air supply pressure and the coolant pressure are to be transmitted, and deforms in accordance with a pressure difference between the first space 85 and the second space 87. In detail, if the internal pressure of the first space 85 is higher than the internal pressure of the second space 87, the partition member 83 deforms by stretching toward the second space 87, such that the capacity of the first space 85 increases whereas the capacity of the second space 87 decreases (see FIG. 4). Accordingly, the capacity of the outlet channel 41 at the outlet side of the coolant circulation pump 45 increases, thus causing the pressure in the outlet channel 41 to decrease. Because the pressure in the air supply channel 12 that communicates with the second space 87 is controlled to a predetermined target pressure, the pressure difference between the pressure in the outlet channel 41 and the pressure in the air supply channel 12 consequently decreases, so that the two pressure values become close to each other.

Figure 5:
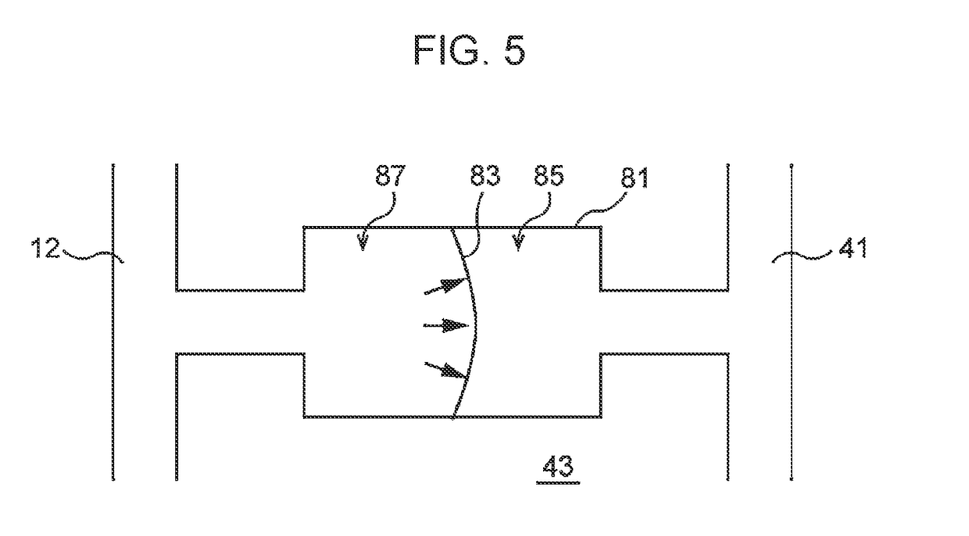
FIG. 5 schematically illustrates the operation of the pressure regulating mechanism.

In contrast, if the internal pressure of the second space 87 is higher than the internal pressure of the first space 85, the partition member 83 deforms by stretching toward the first space 85, such that the capacity of the second space 87 increases whereas the capacity of the first space 85 decreases (see FIG. 5). Accordingly, the capacity of the outlet channel 41 at the outlet side of the coolant circulation pump 45 decreases, thus causing the pressure in the outlet channel 41 to increase. In this case, the pressure difference between the pressure in the outlet channel 41 and the pressure in the air supply channel 12 consequently decreases, so that the two pressure values become close to each other.

Figure 4:
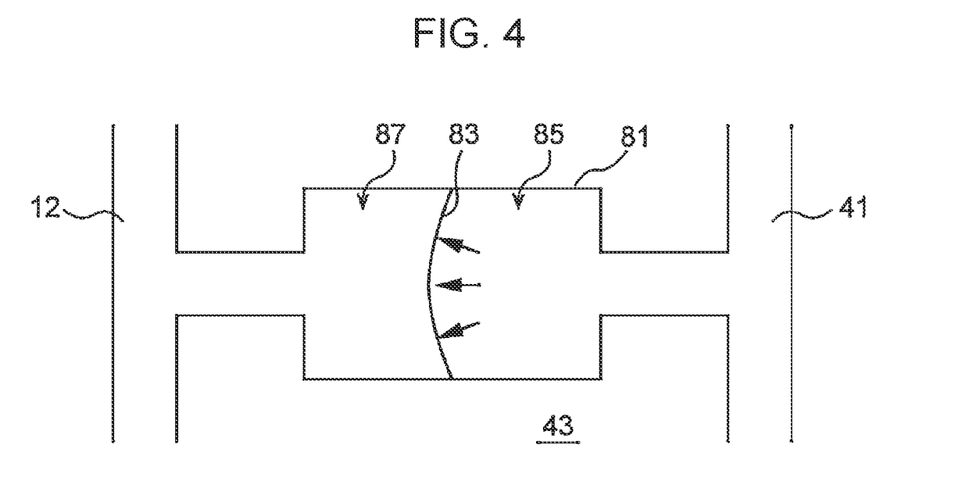
FIG. 4 schematically illustrates the operation of the pressure regulating mechanism.

Accordingly, the pressure difference between the outlet channel 41 communicating with the first space 85 and the air supply channel 12 communicating with the second space 87 is reduced. Thus, in the fuel cell 10, stress applied to the separators 67 disposed between the hydrogen electrodes 61 and the oxygen electrodes 63 decreases. Furthermore, even in a case where the hydrogen electrodes 61 and the oxygen electrodes 63 function as separators, stress applied to the hydrogen electrodes 61 and the oxygen electrodes 63 decreases. Accordingly, the durability of the separators 67 (or either of the hydrogen electrodes 61 and the oxygen electrodes 63) constituting the fuel cell members 71 increases, so that the lifespan of the fuel cell 10 can be extended.

The controller 50 includes a processor, such as either one of a central processing unit (CPU) and a micro processing unit (MPU). The controller 50 may partially or entirely be constituted of an updatable component, such as firmware, or may be, for example, a program module to be executed in accordance with a command from the CPU. Furthermore, the controller 50 includes a storage device that stores, for example, a software program, a control parameter, and acquired information. The storage device may include storage elements, such as a random access memory (RAM) and a read-only memory (ROM), or may include a storage medium, such as a CD-ROM or a storage unit.

The controller 50 controls electric power generation in the fuel cell system 1. In one example, when electric power is to be supplied to a driving motor of a vehicle or when a secondary battery that supplies electric power to the driving motor is to be charged, the controller 50 performs control for causing the fuel cell 10 to generate electricity. The controller 50 controls the driving of the supercharger 15, the back-pressure regulating valve 17, and the pressure regulating valve 23 in accordance with a target generation power based on a required charging power or a required supply power, and controls the air flow rate and the hydrogen-gas flow rate to the fuel cell 10. Moreover, the controller 50 drives the circulation pump 25 to return the hydrogen gas discharged from the fuel cell 10 to the hydrogen supply channel 22 via the circulation channel 28, thereby circulating the hydrogen gas within the fuel cell 10. Accordingly, an electrochemical reaction occurs between the air and the hydrogen gas in the fuel cell 10, whereby electricity is generated.

Furthermore, the controller 50 drives the coolant circulation pump 45 to perform control for cooling the fuel cell 10. A drive control process of the coolant circulation pump 45 will be described in detail below.

Figure 6:
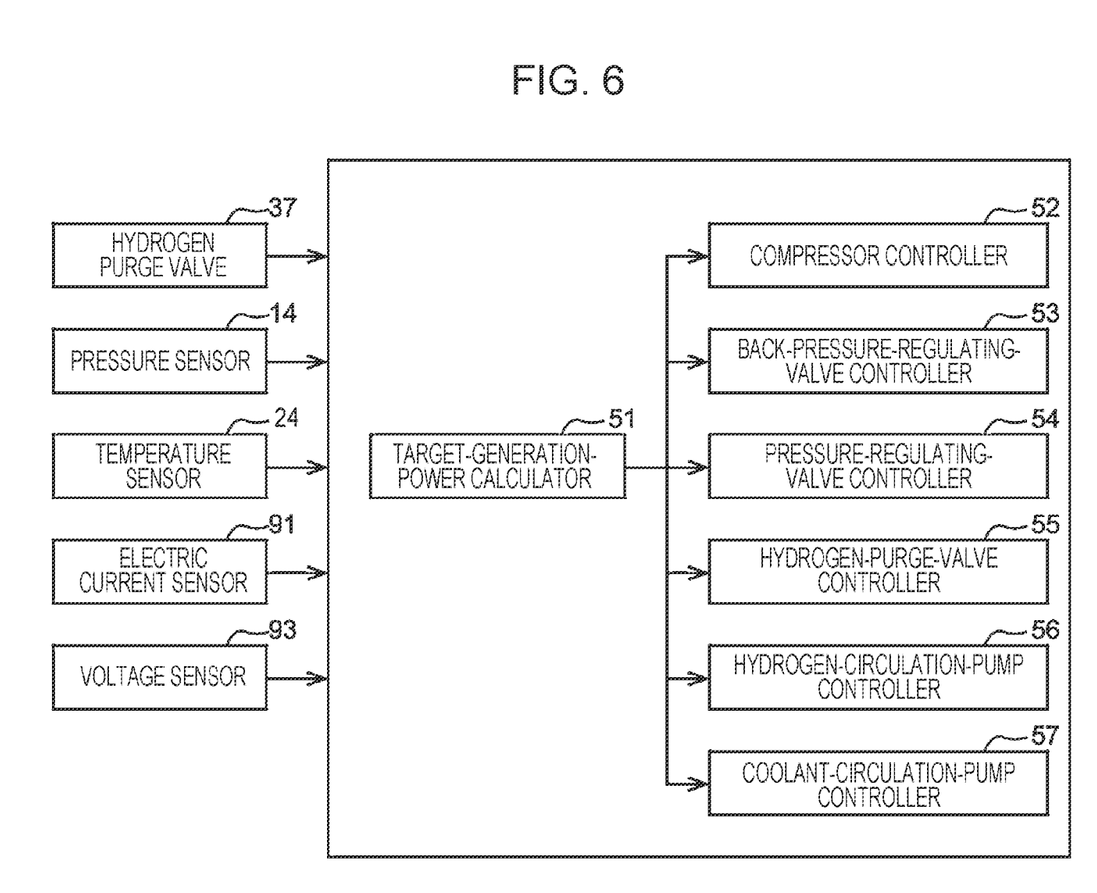
FIG. 6 is a block diagram illustrating a configuration example of a controller of the fuel cell system according to the embodiment.

FIG. 6 is a block diagram illustrating a functional configuration of the components of the controller 50 that are related to the drive control process of the coolant circulation pump 45.

The controller 50 includes a target-generation-power calculator 51, a compressor controller 52, a back-pressure-regulating-valve controller 53, a pressure-regulating-valve controller 54, a hydrogen-purge-valve controller 55, a hydrogen-circulation-pump controller 56, and a coolant-circulation-pump controller 57. These components are functions realized as a result of the processor, such as the CPU, executing a computer program. The controller 50 receives sensor signals from the pressure sensor 14, the temperature sensor 24, an electric current sensor 91, and a voltage sensor 93. The electric current sensor 91 and the voltage sensor 93 are provided in an electrical circuit coupled to the fuel cell 10, and respectively detect an output electric current and an output voltage of the fuel cell 10.

The target-generation-power calculator 51 calculates a target generation power to be generated by the fuel cell 10. For example, in a case where the fuel cell system 1 is equipped in a fuel-cell vehicle, the target-generation-power calculator 51 calculates the target generation power based on at least one of a required supply power to the driving motor serving as a driving source of the vehicle and a required charging power to the secondary battery that supplies electric power to the driving motor. Information about the required supply power to the driving motor is transmitted from, for example, a motor controller. Information about the required charging power to the secondary battery is transmitted from, for example, a battery controller provided in a secondary battery unit. In a case where an electric storage device different from the secondary battery that supplies electric power to the driving motor is provided, the target-generation-power calculator 51 may determine the target generation power by further adding thereto a required charging power to the electric storage device.

The compressor controller 52 sets a target driving amount of the supercharger 15 based on the target generation power, and controls the driving of the supercharger 15. In detail, the compressor controller 52 sets the target driving amount of the supercharger 15 such that air is supplied to the fuel cell 10 at a flow rate according to the target generation power. Alternatively, the compressor controller 52 may set the target driving amount of the supercharger 15 based on an output value of the fuel cell 10 detected by either one of the electric current sensor 91 and the voltage sensor 93 and control the driving of the supercharger 15. In this case, the compressor controller 52 sets the target driving amount of the supercharger 15 such that the flow rate of air to be supplied to the fuel cell 10 accords with an air consumption amount estimated from the output electric current of the fuel cell 10. The target driving amount of the supercharger 15 may be corrected based on the temperature of the fuel cell 10 that has an effect on the power generation capacity of the fuel cell 10.

The back-pressure-regulating-valve controller 53 adjusts the air pressure in the fuel cell 10. In detail, the back-pressure-regulating-valve controller 53 sets a target operation amount of the back-pressure regulating valve 17 based on the target generation power, and adjusts the air pressure in the fuel cell 10 by reducing the channel area of the air discharge channel 18. The target operation amount of the back-pressure regulating valve 17 may be corrected based on the temperature of the fuel cell 10 that has an effect on the power generation capacity of the fuel cell 10.

The pressure-regulating-valve controller 54 and the hydrogen-purge-valve controller 55 set a target pressure of the hydrogen gas circulating through the fuel cell 10 via the circulation channel 28 based on the target generation power, and adjust the pressure of the hydrogen gas to be supplied to the fuel cell 10. The pressure-regulating-valve controller 54 mainly controls the pressure regulating valve 23 when the pressure of the hydrogen gas to be supplied to the fuel cell 10 is to be increased. The hydrogen-purge-valve controller 55 mainly controls the hydrogen purge valve 37 when the pressure of the hydrogen gas circulating through the fuel cell 10 is to be reduced. The target pressure of the hydrogen gas may similarly be corrected based on the temperature of the fuel cell 10.

The hydrogen-circulation-pump controller 56 sets a target driving amount of the circulation pump 25 based on the target generation power, and controls the driving of the circulation pump 25. In detail, the hydrogen-circulation-pump controller 56 sets the target driving amount of the circulation pump 25 such that hydrogen gas is supplied to the fuel cell 10 at a flow rate according to the target generation power. The hydrogen-circulation-pump controller 56 may correct the target driving amount of the circulation pump 25 based on the moisture status inside the fuel cell 10 that has an effect on the degradation and the power generation efficiency of the fuel cell 10. For example, the moisture status inside the fuel cell 10 may be estimated from the power generation status of each of the fuel cell members 71 constituting the fuel cell 10 or the entire stack, or may be estimated by using a hygrometer. Furthermore, the target driving amount of the circulation pump 25 may similarly be corrected based on the temperature of the fuel cell 10. With regard to the target driving amount of the supercharger 15 and the target driving amount of the circulation pump 25, either one of the two target driving amounts may be set in accordance with a flow rate corresponding to the other target driving amount.

The coolant-circulation-pump controller 57 controls the rotation speed of the coolant circulation pump 45 in accordance with a heat release amount required by the fuel cell 10. For example, the coolant-circulation-pump controller 57 determines a required heat release amount for maintaining the temperature of the fuel cell 10 to a predetermined temperature or lower based on the target generation power, having a correlative relationship with the amount of heat generated, and the current temperature of the fuel cell 10, and controls the rotation speed of the coolant circulation pump 45 such that the coolant flows at a predetermined flow rate through the coolant channel 78 of the fuel cell 10. In this case, the rotation speed of the coolant circulation pump 45 is set to increase with increasing target generation power of the fuel cell 10 and increasing current temperature, such that the flow rate of the coolant increases. The coolant-circulation-pump controller 57 may determine the required heat release amount by referring to a map that defines the relationship among the target generation power, the temperature of the fuel cell 10, and the required heat release amount. An output power may be used in place of the target generation power. Moreover, the coolant-circulation-pump controller 57 may control the rotation speed of the coolant circulation pump 45 in view of the temperature of the coolant to be supplied to the fuel cell 10. In this case, the rotation speed of the coolant circulation pump 45 is set to increase with increasing temperature of the coolant, such that the flow rate of the coolant increases.

As described above, the fuel cell system 1 according to this embodiment uses the pressure regulating mechanism 43 to equalize the coolant pressure and the air supply pressure, so as to reduce stress occurring in a separator 67 interposed between the hydrogen electrode 61 and the oxygen electrode 63 in the fuel cell 10, thereby suppressing a decrease in the lifespan of the fuel cell 10. However, if the rotation speed (output) of the coolant circulation pump 45 increases regardless of low air supply pressure to the fuel cell 10, the pressure at the inlet of the coolant circulation pump 45 decreases due to a pressure loss occurring when the coolant discharged from the fuel cell 10 travels through a pipe or the cooler 47, thus causing cavitation to occur easily.

Therefore, the coolant-circulation-pump controller 57 sets an upper limit for the rotation speed of the coolant circulation pump 45 based on either one of the coolant pressure at the inlet of the coolant circulation pump 45 and a correlation value of the coolant pressure. Accordingly, a significant decrease in the pressure at the inlet of the coolant circulation pump 45 is suppressed, thereby suppressing the occurrence of cavitation at the inlet. In this embodiment, the coolant-circulation-pump controller 57 uses the value of the air supply pressure detected by the pressure sensor 14 as the correlation value of the coolant pressure at the inlet.

In detail, in the fuel cell system 1 according to this embodiment, the pressure regulating mechanism 43 performs an adjustment such that the pressure in the outlet channel 41 through which the coolant to be supplied to the fuel cell 10 flows becomes a value equal to that of the air supply pressure. Therefore, the air supply pressure detected by the pressure sensor 14 indicates the coolant pressure at the outlet of the coolant circulation pump 45. The relationship among the coolant pressure at the outlet of the coolant circulation pump 45, the discharge flow rate of the coolant circulation pump 45, and the pressure at the inlet of the coolant circulation pump 45 can be determined in advance from simulation or actual measurement. The discharge flow rate of the coolant circulation pump 45 is determined based on the rotation speed of the coolant circulation pump 45. Therefore, the rotation speed of the coolant circulation pump 45 at which the pressure at the inlet of the coolant circulation pump 45 may serve as a lower-limit pressure that may possibly cause cavitation to occur can be set in advance in accordance with the air supply pressure.

In view of this, the coolant-circulation-pump controller 57 sets the upper limit for the rotation speed of the coolant circulation pump 45 based on the air supply pressure detected by the pressure sensor 14 and the coolant temperature at the inlet of the coolant circulation pump 45, such that the pressure at the inlet of the coolant circulation pump 45 does not decrease to the lower-limit pressure at which cavitation may possibly occur. For example, the coolant-circulation-pump controller 57 sets the upper limit for the rotation speed of the coolant circulation pump 45 by referring to a map that defines the relationship among the air supply pressure, the coolant temperature, and a maximum rotation speed of the coolant circulation pump 45. The coolant-circulation-pump controller 57 controls the coolant circulation pump 45 in a range lower than or equal to the determined upper limit of the rotation speed. Accordingly, the occurrence of cavitation at the inlet of the coolant circulation pump 45 is suppressed, so that a decrease in the lifespan of the fuel cell 10 can be suppressed.

Figure 7:
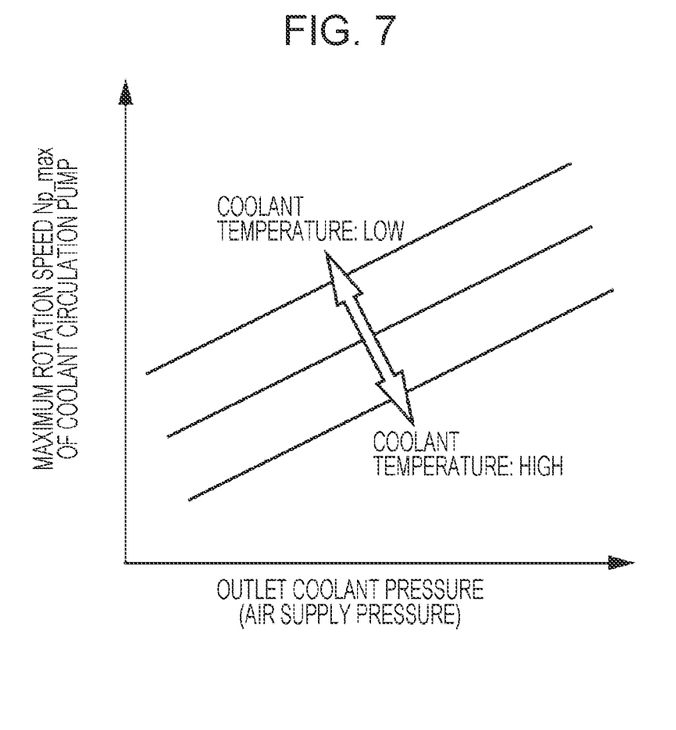
FIG. 7 illustrates a method for setting a maximum rotation speed of a coolant circulation pump.
Figure 8:
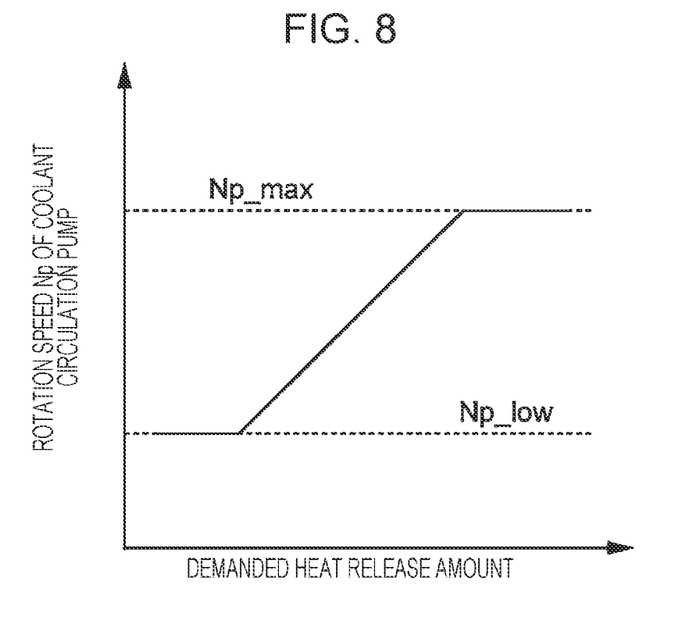
FIG. 8 illustrates a control range of the rotation speed of the coolant circulation pump.

FIG. 7 and FIG. 8 are diagrams for explaining the control range of the rotation speed of the coolant circulation pump 45. FIG. 7 is a diagram illustrating a maximum rotation speed serving as an upper limit for the rotation speed of the coolant circulation pump 45 set based on the coolant pressure and the coolant temperature. FIG. 8 is a diagram illustrating the control range of the rotation speed of the coolant circulation pump 45 assuming that the air supply pressure is controlled with a fixed value.

As illustrated in FIG. 7, a maximum rotation speed Np_max of the coolant circulation pump 45 is set to increase with increasing coolant pressure at the outlet of the coolant circulation pump 45, that is, increasing air supply pressure detected by the pressure sensor 14. This is because the outlet of the coolant circulation pump 45 communicates with the inlet thereof via the fuel cell 10, the cooler 47, and a pipe in the coolant circuit 40, and even through a pressure loss occurs as the coolant travels through them, the coolant pressure at the inlet increases in accordance with the coolant pressure at the outlet.

Furthermore, the maximum rotation speed Np_max of the coolant circulation pump 45 is set to increase with decreasing coolant temperature at the inlet of the coolant circulation pump 45. This is because the cavitation is in a state where the coolant is boiling locally at the inlet of the coolant circulation pump 45, and the coolant is likely to boil as the temperature of the coolant increases. Moreover, in a state where the coolant temperature has decreased to a predetermined temperature or lower, the maximum rotation speed Np_max of the coolant circulation pump 45 is fixed at a rated maximum rotation speed.

The coolant temperature at the inlet of the coolant circulation pump 45 may be, for example, an actually measured value obtained by using a temperature sensor, or may be an estimated value obtained based on the coolant temperature at the outlet of the fuel cell 10 and the operating state of the cooler 47. Alternatively, the coolant temperature at the inlet of the fuel cell 10 may be used in place of the coolant temperature at the inlet of the coolant circulation pump 45. This is because the coolant temperature at the inlet of the coolant circulation pump 45 is normally lower than the coolant temperature at the inlet of the fuel cell 10, and cavitation can be sufficiently suppressed by setting the maximum rotation speed Np_max of the coolant circulation pump 45 in accordance with the coolant temperature at the inlet of the fuel cell 10.

In a case where the air supply pressure is controlled with a fixed value, as illustrated in FIG. 8, the rotation speed of the coolant circulation pump 45 is controlled so as to increase in proportion to the required heat release amount between the maximum rotation speed Np_max set based on the air supply pressure and a minimum rotation speed Np_min limited due to the specification of the coolant circulation pump 45. Accordingly, the occurrence of cavitation at the inlet of the coolant circulation pump 45 can be suppressed.

Although the rotation speed of the coolant circulation pump 45 is limited to the maximum rotation speed Np_max or lower even when the required heat release amount is a significantly large value, if the coolant circulation pump 45 is supposedly controlled beyond the maximum rotation speed Np_max, the flow rate of the coolant cannot be increased to a desired flow rate after cavitation begins to occur. Therefore, controlling the rotation speed of the coolant circulation pump 45 beyond the maximum rotation speed Np_max may make it difficult to ensure the cooling capacity, and may also cause the coolant circuit to malfunction due to the cavitation. Consequently, setting the upper limit for the rotation speed of the coolant circulation pump 45 in the fuel cell system 1 according to this embodiment is effective.

Next, a control process of the coolant circulation pump 45 in the fuel cell system 1 according to this embodiment will be described.

Figure 9:
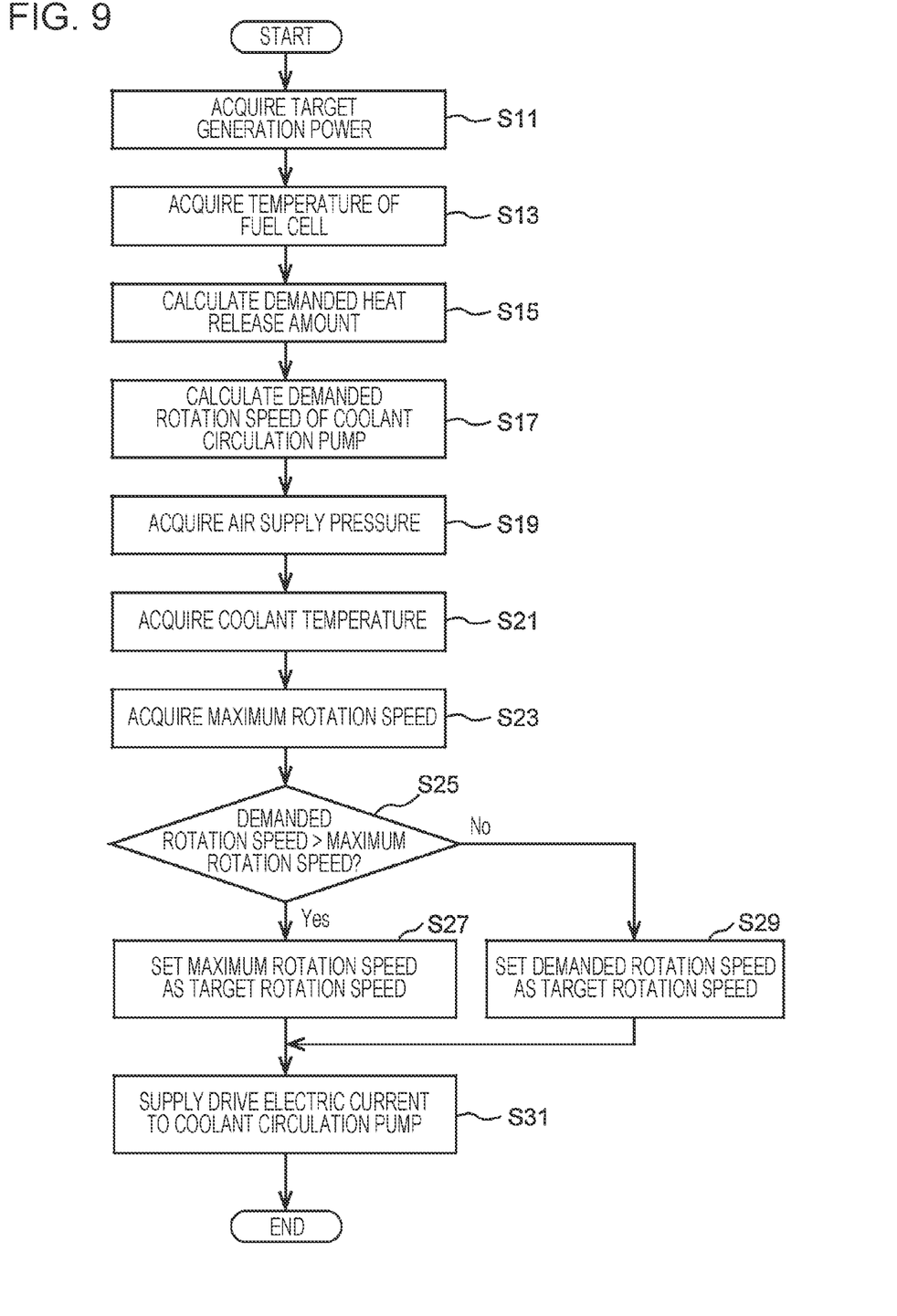
FIG. 9 is a flowchart illustrating an operation example of the fuel cell system according to the embodiment.

FIG. 9 is a flowchart illustrating the control process of the coolant circulation pump 45.

In step S11, the target-generation-power calculator 51 of the controller 50 acquires a target generation power of the fuel cell 10. For example, the target-generation-power calculator 51 calculates the target generation power by adding together a required supply power transmitted from the motor controller that controls the driving motor of the vehicle and a required charging power transmitted from the battery controller that controls the secondary battery. Alternatively, the target-generation-power calculator 51 may calculate the target generation power by adding together other required electric power values. Instead of acquiring the target generation power, the target-generation-power calculator 51 may acquire an output power (i.e., an output electric current or an output voltage) of the fuel cell 10.

In step S13, the coolant-circulation-pump controller 57 acquires the temperature of the fuel cell 10 based on a sensor signal from the temperature sensor 24. Then, in step S15, the coolant-circulation-pump controller 57 refers to a map stored in advance in the storage device to calculate a required heat release amount for maintaining the temperature of the fuel cell 10 to a predetermined temperature or lower based on the acquired target generation power or the output power of the fuel cell 10 and the current temperature of the fuel cell 10.

In step S17, the coolant-circulation-pump controller 57 refers to a map stored in advance in the storage device to calculate a required rotation speed of the coolant circulation pump 45 in accordance with the required heat release amount. Such a required rotation speed is a rotation speed at which the coolant is dischargeable at a flow rate according to the required heat release amount without taking into consideration the upper limit of the rotation speed. Alternatively, the coolant-circulation-pump controller 57 may calculate the required rotation speed of the coolant circulation pump 45 in view of the coolant temperature.

In step S19, the coolant-circulation-pump controller 57 acquires an air supply pressure to be supplied to the fuel cell 10 based on a sensor signal from the pressure sensor 14. In this embodiment, the pressure regulating mechanism 43 is coupled between the air supply channel 12 and the outlet channel 41 of the coolant circuit 40, and the air supply pressure in the air supply channel 12 and the coolant pressure in the outlet channel 41 are equal to each other. Therefore, the acquired air supply pressure can be regarded as the coolant pressure at the outlet of the coolant circulation pump 45.

In step S21, the coolant-circulation-pump controller 57 acquires a coolant temperature at the inlet of the coolant circulation pump 45. Such a coolant temperature may be an actually measured value obtained by using a temperature sensor, or may be an estimated value obtained based on the coolant temperature at the outlet of the fuel cell 10 and the operating state of the cooler 47. Alternatively, the coolant temperature at the inlet of the fuel cell 10 may be used in place of the coolant temperature at the inlet of the coolant circulation pump 45.

In step S23, the coolant-circulation-pump controller 57 acquires a maximum rotation speed Np_max serving as the rotation speed of the coolant circulation pump 45 based on the acquired air supply pressure. For example, the coolant-circulation-pump controller 57 acquires the maximum rotation speed Np_max based on the air supply pressure by referring to a map set in advance in view of a pressure loss occurring when the coolant travels through the coolant circuit 40 and the specification of the coolant circulation pump 45.

In step S25, the coolant-circulation-pump controller 57 determines whether the required rotation speed calculated in step S17 is higher than the maximum rotation speed Np_max. If the required rotation speed is higher than the maximum rotation speed Np_max (Yes in step S25), the coolant-circulation-pump controller 57 sets the maximum rotation speed Np_max as a target rotation speed in step S27. In contrast, if the required rotation speed is lower than or equal to the maximum rotation speed Np_max (No in step S25), the coolant-circulation-pump controller 57 sets the required rotation speed as a target rotation speed in step S29.

In step S31, the coolant-circulation-pump controller 57 calculates a drive electric current to be supplied to the coolant circulation pump 45 based on the target rotation speed set in step S27 or step S29, and outputs a driving signal to a driving circuit of the coolant circulation pump 45. Accordingly, the coolant circulation pump 45 is controlled in a range lower than or equal to the maximum rotation speed Np_max set such that the coolant pressure at the inlet does not decrease to a lower-limit pressure at which cavitation may possibly occur. Consequently, an abnormal sound or vibrations caused by the driving of the coolant circulation pump 45 can be suppressed, and a malfunction of the coolant circuit 40 can be prevented.

Furthermore, because the pressure regulating mechanism 43 is provided between the outlet channel 41 of the coolant circuit 40 and the air supply channel 12, a pressure difference between the air pressure and the coolant pressure in the fuel cell 10 can be reduced while the fuel cell 10 generates electricity. Therefore, stress applied to a separator 67 disposed between the hydrogen electrode 61 and the cooling plate 65 is reduced, so that a decrease in the lifespan of the fuel cell 10 can be suppressed.

Although the pressure regulating mechanism 43 described in the above embodiment is configured to change the capacity of the outlet channel 41 in the coolant circuit 40 in accordance with deformation of the stretchable partition member 83 joined to the inner peripheral surface of the housing 81, various modifications of the pressure regulating mechanism 43 are possible.

Figure 10:
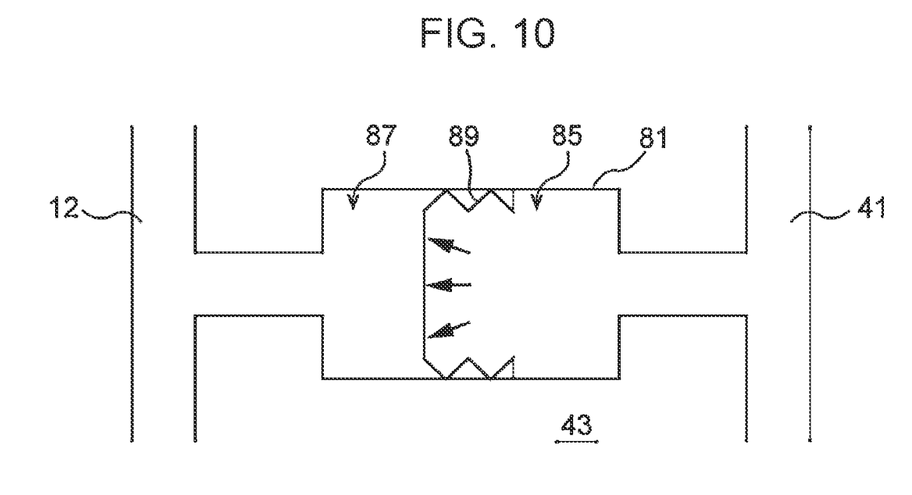
FIG. 10 schematically illustrates a modification of the pressure regulating mechanism.
Figure 11:
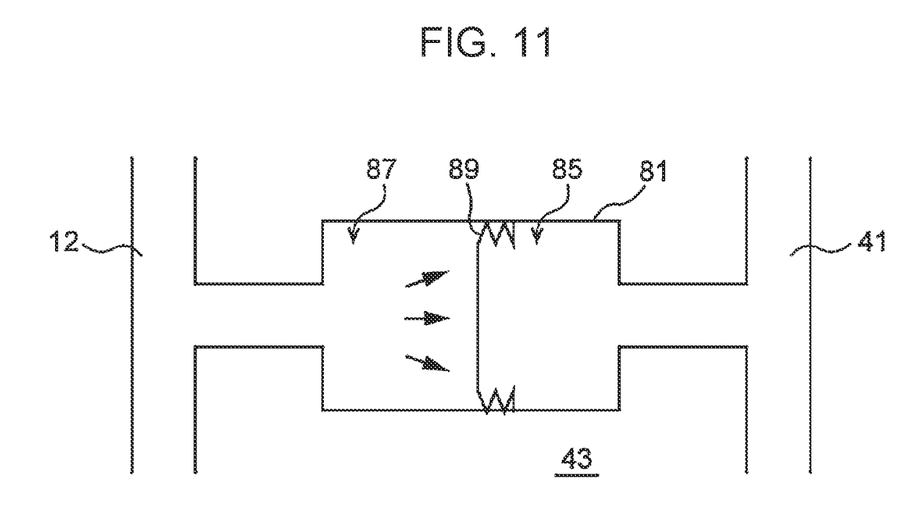
FIG. 11 schematically illustrates the modification of the pressure regulating mechanism.

FIG. 10 and FIG. 11 illustrate a modification of the pressure regulating mechanism 43. The pressure regulating mechanism 43 according to this modification includes a bellows partition member 89 joined to the inner peripheral surface of the housing 81.

In the pressure regulating mechanism 43 having such a configuration, the bellows partition member 89 functions as an interface to which the air supply pressure and the coolant pressure are to be transmitted, and deforms in accordance with a pressure difference between the first space 85 and the second space 87. In detail, if the internal pressure of the first space 85 is higher than the internal pressure of the second space 87, the partition member 89 deforms by stretching toward the second space 87, such that the capacity of the first space 85 increases whereas the capacity of the second space 87 decreases (see FIG. 10). In contrast, if the internal pressure of the second space 87 is higher than the internal pressure of the first space 85, the partition member 89 deforms by contracting, such that the capacity of the second space 87 increases whereas the capacity of the first space 85 decreases (see FIG. 11).

Even with the pressure regulating mechanism 43 having such a configuration, the pressure difference between the outlet channel 41 communicating with the first space 85 and the air supply channel 12 communicating with the second space 87 can be reduced. Accordingly, in the fuel cell 10, the durability of the separator 67 disposed between the hydrogen electrode 61 and the cooling plate 65 increase, so that the lifespan of the fuel cell 10 can be extended.

As an alternative to the pressure regulating mechanism 43 illustrated in FIG. 10 and FIG. 11, another mechanism may be appropriately used so long as the mechanism has an interface to which the air supply pressure and the coolant pressure are to be transmitted, is deformable at the position of the interface in accordance with a pressure difference between the pressure in the air supply channel 12 and the pressure in the outlet channel 41 of the coolant circuit 40, is configured not to cause the coolant to flow out toward the air supply channel 12, and is configured not to cause the air to flow toward the outlet channel 41. For example, an alternative pressure regulating mechanism may be configured such that the air supply channel 12 communicates with an upper gas-phase area of a space that communicates with the outlet channel 41 through which the coolant flows and that retains the coolant, and that the water surface rises and falls in accordance with the coolant pressure and the air supply pressure. In this case, the coolant is prevented from flowing out toward the air supply channel 12 even when the water surface of the coolant in the space rises, and the air is prevented from flowing toward the outlet channel 41 even when the water surface of the coolant falls. Moreover, for example, the pressure regulating mechanism may be configured to couple the outlet channel 41 and the air supply channel 12 to each other by using a channel having a small cross-sectional area, prevent the coolant from flowing out toward the air supply channel 12 even when the position of the interface changes due to the balance between the coolant pressure and the air supply pressure, and has the aforementioned channel with an increased length to prevent the air from flowing into the outlet channel 41.

As described above, in the fuel cell system 1 according to this embodiment, the pressure regulating mechanism 43 that regulates the coolant pressure in the fuel cell 10 is provided separately from the coolant circulation pump 45, so that the pressure difference between the air pressure or the hydrogen-gas pressure and the coolant pressure in the fuel cell 10 can be reduced while the flow rate of the coolant to be supplied to the fuel cell 10 can be maintained. Therefore, a decrease in the cooling capacity can be suppressed, while stress applied to the separators 67a (or 67c) and 67b can be reduced, thereby suppressing a decrease in the lifespan of the fuel cell 10. Because such a pressure regulating mechanism 43 is a capacity variable mechanism that operates based on a pressure balance instead of being electrically controlled, the pressure difference can be reduced without increasing the load on the controller 50.

Furthermore, in the fuel cell system 1 according to this embodiment, the rotation speed of the coolant circulation pump 45 is controlled in the range lower than or equal to the maximum rotation speed Np_max set based on the air supply pressure having a correlative relationship with the coolant pressure at the inlet, such that the inlet pressure does not cause cavitation to occur. Consequently, an abnormal sound or vibrations caused by the driving of the coolant circulation pump 45 can be suppressed, and a malfunction of the coolant circuit 40 can be suppressed.

In this embodiment, the pressure regulating mechanism 43 adjusts the coolant pressure in the outlet channel 41 of the coolant circuit 40 to be the same value as the air supply pressure, so that the value of the air supply pressure detected by the pressure sensor 14 can be used as a correlation value of the coolant pressure at the inlet. Therefore, the maximum rotation speed Np_max of the coolant circulation pump 45 can be set by using the pressure sensor 14 provided to be used for controlling the air supply pressure, thereby suppressing an increase in cost.

Although the embodiment of the disclosure has been described above with reference to the appended drawings, the disclosure is not to be limited to the above example. It is obvious to a person having a common knowledge in the technical field to which the disclosure belongs that various modifications and alterations are conceivable within the technical scope described in the claims, and it is to be understood that such modifications and alterations belong to the technical scope of the disclosure.

For example, as an alternative to the above embodiment in which the pressure regulating mechanism 43 is provided between the outlet channel 41 in the coolant circuit 40 and the air supply channel 12, a pressure regulator may be provided between the outlet channel 41 and the hydrogen supply channel 22. Since the supply pressures of air and hydrogen gas to be supplied to the fuel cell 10 are controlled to be identical values, a similar effect can be achieved with such a configuration.

Furthermore, as an alternative to the above embodiment in which the pressure regulating mechanism 43 adjusts the air supply pressure or the hydrogen supply pressure to be supplied to the fuel cell 10 and the coolant pressure to the same value, for example, the pressure regulating mechanism 43 may be configured to adjust the air pressure or the hydrogen pressure flowing out from the fuel cell 10 and the coolant pressure to be the same value. In one embodiment, the hydrogen pressure may serve as a "reactant gas pressure". As another alternative, the pressure regulating mechanism 43 may be configured to adjust the supply pressure of the air or hydrogen to be supplied to the fuel cell 10 and the pressure of the coolant flowing out from the fuel cell 10 to have a predetermined pressure difference, or the pressure of the air or hydrogen flowing out from the fuel cell 10 and the pressure of the coolant to be supplied to the fuel cell 10 to have a predetermined pressure difference. Even in a case where such a pressure regulating mechanism 43 is used, the pressure difference between the air pressure or the hydrogen gas pressure and the coolant pressure in the fuel cell 10 can be reduced, a decrease in the lifespan of the fuel cell 10 can be suppressed, and the occurrence of cavitation at the inlet of the coolant circulation pump 45 can be suppressed, so that the occurrence of an abnormal sound or vibrations caused by the driving of the coolant circulation pump 45 can be suppressed.

Furthermore, as an alternative to the above embodiment in which the air supply pressure is used as a correlation value of the coolant pressure at the inlet of the coolant circulation pump 45, either one of the coolant pressure at the inlet of the coolant circulation pump 45 and the hydrogen supply pressure may be detected by using an additional pressure sensor, and the maximum rotation speed Np_max of the coolant circulation pump 45 may be set by using these pressure values.

Furthermore, as an alternative to the above embodiment in which the maximum rotation speed Np_max of the coolant circulation pump 45 is set by using both the coolant pressure at the inlet of the coolant circulation pump 45 or the correlation value of the coolant pressure and the coolant temperature at the inlet of the coolant circulation pump 45 or the correlation value of the coolant temperature, the maximum rotation speed Np_max of the coolant circulation pump 45 may be set based on either one of the coolant pressure at the inlet of the coolant circulation pump 45 or the correlation value of the coolant pressure and the coolant temperature at the inlet of the coolant circulation pump 45 or the correlation value of the coolant temperature. Even in such a case, the occurrence of cavitation at the inlet of the coolant circulation pump 45 can still be suppressed.

According to the above embodiment of the disclosure, the pressure difference between the coolant pressure in the fuel cell 10 and the reactant gas pressure to be supplied to the fuel cell 10 can be suppressed, the occurrence of cavitation at the inlet of the coolant circulation pump 45 can be suppressed, and the cooling efficiency of the fuel cell 10 can be maintained.

The controller 50 illustrated in FIG. 1 and FIG. 6 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 50 including the target-generation-power calculator 51, the compressor controller 52, the back-pressure-regulating-valve controller 53, the pressure-regulating-valve controller 54, the hydrogen-purge-valve controller 55, the hydrogen-circulation-pump controller 56, and the coolant-circulation-pump controller 57. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1 and FIG. 6.

The invention claimed is:

1. A fuel cell system comprising:
    a fuel cell comprising an anode gas channel, a cathode gas channel, and a coolant channel;
    a supercharger configured to apply pressure to cathode gas and supply the cathode gas to the fuel cell;
    a coolant circuit provided with a coolant circulation pump and a cooler and configured to circulate a coolant to be supplied to the coolant channel;
    a pump controller configured to control a rotation speed of the coolant circulation pump in accordance with a heat release amount required by the fuel cell; and
    a pressure regulating mechanism provided independently of the coolant circulation pump and configured to regulate coolant pressure in the fuel cell, wherein the pump controller is configured to control the coolant circulation pump in a range lower than or equal to an upper limit for the rotation speed of the coolant circulation pump, the upper limit being set based on one or both of coolant pressure at an inlet of the coolant circulation pump or a correlation value of the coolant pressure at the inlet of the coolant circulation pump and a coolant temperature at the inlet of the coolant circulation pump or a correlation value of the coolant temperature, wherein the pressure regulating mechanism is coupled to a first channel and a second channel, the first channel is coupled to the anode gas channel or the cathode gas channel, the second channel is coupled to the coolant channel, and wherein the pressure regulating mechanism is configured to reduce a pressure difference between the first channel and the second channel.

2. The fuel cell system according to claim 1,
wherein the pressure regulating mechanism comprises a housing including a space and a partition member that partitions the space of the housing into a first space that communicates the first channel and a second space that communicates the second channel, and
wherein the pressure regulating mechanism is configured to change either one of a position and a shape of the partition member in accordance with the pressure difference between the first channel and the second channel.

3. The fuel cell system according to claim 1,
wherein a detection value of a pressure sensor configured to detect pressure of air to be supplied to the fuel cell is used as the correlation value of the coolant pressure at the inlet of the coolant circulation pump.

4. The fuel cell system according to claim 2,
wherein a detection value of a pressure sensor configured to detect pressure of air to be supplied to the fuel cell is used as the correlation value of the coolant pressure at the inlet of the coolant circulation pump.

5. The fuel cell system according to claim 1,
wherein the pump controller is configured to set the upper limit for the rotation speed such that the coolant pressure at the inlet of the coolant circulation pump does not fall below a predetermined threshold value.

6. The fuel cell system according to claim 2,
wherein the pump controller is configured to set the upper limit for the rotation speed such that the coolant pressure at the inlet of the coolant circulation pump does not fall below a predetermined threshold value.

7. The fuel cell system according to claim 3,
wherein the pump controller is configured to set the upper limit for the rotation speed such that the coolant pressure at the inlet of the coolant circulation pump does not fall below a predetermined threshold value.

8. The fuel cell system according to claim 4,
wherein the pump controller is configured to set the upper limit for the rotation speed such that the coolant pressure at the inlet of the coolant circulation pump does not fall below a predetermined threshold value.

9. A fuel cell system comprising:
a fuel cell comprising an anode gas channel, a cathode gas channel, and a coolant channel;
a supercharger configured to apply pressure to cathode gas and supply the cathode gas to the fuel cell;
a coolant circuit provided with a coolant circulation pump and a cooler and configured to circulate a coolant to be supplied to the coolant channel;
a pressure regulating mechanism provided independently of the coolant circulation pump and configured to regulate coolant pressure in the fuel cell; and
circuitry configured to
control a rotation speed of the coolant circulation pump in accordance with a heat release amount required by the fuel cell, and
control the coolant circulation pump in a range lower than or equal to an upper limit for the rotation speed of the coolant circulation pump, the upper limit being set based on one or both of coolant pressure at an inlet of the coolant circulation pump or a correlation value of the coolant pressure at the inlet of the coolant circulation pump and a coolant temperature at the inlet of the coolant circulation pump or a correlation value of the coolant temperature, wherein the pressure regulating mechanism is coupled to a first channel and a second channel, the first channel is coupled to the anode gas channel or the cathode gas channel, the second channel is coupled to the coolant channel, and wherein the pressure regulating mechanism is configured to reduce a pressure difference between the first channel and the second channel.

10. The fuel cell system according to claim 1,
wherein the first channel is coupled to the cathode gas channel and the supercharger, and
wherein the second channel is coupled to the coolant channel and the coolant circulation pump.

11. The fuel cell system according to claim 2,
wherein the first channel is coupled to the cathode gas channel and the supercharger, and
wherein the second channel is coupled to the coolant channel and the coolant circulation pump.

12. The fuel cell system according to claim 1,
wherein the pump controller is configured to control the coolant circulation pump in a range lower than or equal to an upper limit for the rotation speed of the coolant circulation pump, the upper limit being set based on the coolant pressure at the inlet of the coolant circulation pump or the correlation value of the coolant pressure at the inlet of the coolant circulation pump and the coolant temperature at the inlet of the coolant circulation pump or the correlation value of the coolant temperature.

13. The fuel cell system according to claim 2,
wherein the pump controller is configured to control the coolant circulation pump in a range lower than or equal to an upper limit for the rotation speed of the coolant circulation pump, the upper limit being set based on the coolant pressure at the inlet of the coolant circulation pump or the correlation value of the coolant pressure at the inlet of the coolant circulation pump and the coolant temperature at the inlet of the coolant circulation pump or the correlation value of the coolant temperature.

14. The fuel cell system according to claim 10,
wherein the pump controller is configured to control the coolant circulation pump in a range lower than or equal to an upper limit for the rotation speed of the coolant circulation pump, the upper limit being set based on the coolant pressure at the inlet of the coolant circulation pump or the correlation value of the coolant pressure at the inlet of the coolant circulation pump and the coolant temperature at the inlet of the coolant circulation pump or the correlation value of the coolant temperature.

15. The fuel cell system according to claim 11,
wherein the pump controller is configured to control the coolant circulation pump in a range lower than or equal to an upper limit for the rotation speed of the coolant circulation pump, the upper limit being set based on the coolant pressure at the inlet of the coolant circulation pump or the correlation value of the coolant pressure at the inlet of the coolant circulation pump and the coolant temperature at the inlet of the coolant circulation pump or the correlation value of the coolant temperature.

16. The fuel cell system according to claim 10,
wherein the fuel cell system further comprises a pressure sensor configured to detect pressure of the first channel, and
wherein the pump controller is configured to set the upper limit based on the detected pressure of the first channel as the correlation value of the coolant pressure and the coolant temperature at the inlet of the coolant circulation pump.

17. The fuel cell system according to claim 11,
wherein the fuel cell system further comprises a pressure sensor configured to detect pressure of the first channel, and
wherein the pump controller is configured to set the upper limit based on the detected pressure of the first channel as the correlation value of the coolant pressure and the coolant temperature at the inlet of the coolant circulation pump.

* * * * *